(12) United States Patent
Ugawa et al.

(10) Patent No.: US 7,824,810 B2
(45) Date of Patent: Nov. 2, 2010

(54) ELECTROLYTIC SOLUTION AND BATTERY

(75) Inventors: Shinsaku Ugawa, Fukushima (JP); Yoshikatsu Yamamoto, Fukushima (JP)

(73) Assignee: Sony Corporation, Tokyo (JP)

( * ) Notice: Subject to any disclaimer, the term of this patent is extended or adjusted under 35 U.S.C. 154(b) by 1057 days.

(21) Appl. No.: 11/422,957

(22) Filed: Jun. 8, 2006

(65) Prior Publication Data

US 2006/0281012 A1    Dec. 14, 2006

(30) Foreign Application Priority Data

Jun. 9, 2005    (JP)    ............................ P2005-169479

(51) Int. Cl.
*H01M 6/16*    (2006.01)
(52) U.S. Cl. ........................ 429/327; 429/324; 429/329; 429/330; 429/340; 429/341
(58) Field of Classification Search ................. 429/324, 429/326, 327, 329, 330, 340
See application file for complete search history.

(56) References Cited

U.S. PATENT DOCUMENTS 7,174,207 B2 *    2/2007    Dodd et al. ..................... 607/5

* cited by examiner

*Primary Examiner*—Patrick Ryan
*Assistant Examiner*—Julian Mercado
(74) *Attorney, Agent, or Firm*—Sonnenschein Nath & Rosenthal LLP

(57) ABSTRACT

An electrolytic solution capable of inhibiting self-discharge even under the high temperatures and a battery using the electrolytic solution are provided. A spirally wound electrode body in which a cathode and an anode are wound with a separator in between and spirally wound is included inside the battery can. An electrolytic solution is impregnated in the separator. The electrolytic solution contains ethylene sulfite, vinylene carbonate, $LiPF_6$, and a light metal salt such as lithium difluoro[oxalato-O,O']borate in a given range. Thereby, the self-discharge can be inhibited even under the high temperatures.

4 Claims, 5 Drawing Sheets

ELECTROLYTIC SOLUTION AND BATTERY

CROSS REFERENCES TO RELATED APPLICATIONS

The present invention contains subject matter related to Japanese Patent Application JP 2005-169479 filed in the Japanese Patent Office on Jun. 9, 2005, the entire contents of which being incorporated herein by reference.

BACKGROUND OF THE INVENTION

1. Field of the Invention

The present invention relates to an electrolytic solution containing a solvent and an electrolyte salt, and a battery using the electrolytic solution.

2. Description of the Related Art

In recent years, many portable electronic devices such as a notebook portable computer, a mobile phone, and a combination VTR (video tape recorder) have been introduced. Downsizing and weight saving of these devices have been made. Accordingly, as a power source for the portable electronic devices, lightweight secondary batteries capable of providing a high energy density have been developed. As a secondary battery capable of providing a high energy density, for example, lithium ion secondary batteries using a material capable of inserting and extracting lithium (Li) such as a carbon material as an anode active material are known.

In the lithium ion secondary batteries, it has been traditionally considered to add an additive to the electrolytic solution in order to improve various battery characteristics. For example, in Japanese Unexamined Patent Application Publication Nos. 2002-373703, 2002-184460, 2002-184465, and 2002-110235, a method for improving storage characteristics and cycle characteristics by adding a specific salt is proposed. In addition, in Japanese Patent No. 3546566, a method for improving an initial capacity and cycle characteristics by mixing ethylene sulfite with ethylene carbonate is proposed. Further, in Japanese Patent No. 3560119, a method for improving low temperature characteristics, long-term stability, and cycle characteristics by using ethylene sulfite and vinylene carbonate is proposed.

SUMMARY OF THE INVENTION

As the portable electronic devices have grown in usage, in recent years, there has been a disadvantage that when the portable electronic devices are under the high temperatures in transit time, in use or the like, the battery characteristic are lowered due to self-discharge. To address the disadvantage, the inhibition effect is not always sufficient when using the foregoing method. Therefore, further improvement has been desired.

In view of the foregoing, in the present invention, it is desirable to provide an electrolytic solution capable of inhibiting self-discharge even under the high temperatures and a battery using the electrolytic solution.

According to an embodiment of the present invention, there is provided an electrolytic solution containing ethylene sulfite, vinylene carbonate, $LiPF_6$, and a light metal salt shown in Chemical formula 1, wherein the ethylene sulfite content is in the range from 0.1 wt % to 3 wt %, the vinylene carbonate content is in the range from 0.1 wt % to 5 wt %, the $LiPF_6$ content is in the range from 10 wt % to 18 wt %, and the content of the light metal salt shown in Chemical formula 1 is in the range from 0.025 wt % to 1 wt %.

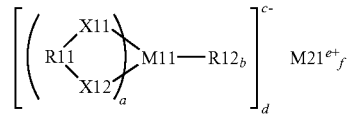

Chemical formula 1

In the formula, R11 represents a —C(=O)—R21-C(=O)- group (R21 represents an alkylene group, an alkylene halide group, an arylene group, or an arylene halide group), or a —C(=O)—C(=O)-group. R12 represents a halogen group, an alkyl group, an alkyl halide group, an aryl group, or an aryl halide group. X11 and X12 represent oxygen (O) or sulfur (S), respectively. M11 represents a transition metal element, or a 3B Group element, a 4B Group element, or a 5B Group element in the short period periodic table. M21 represents an 1A Group element or a 2A Group element in the short period periodic table or aluminum (Al). a represents an integer number from 1 to 4. b represents an integer number from 0 to 8. c, d, e, and f represent an integer number from 1 to 3, respectively.

According to an embodiment of the present invention, there is provided a battery including a cathode, an anode, and an electrolytic solution, wherein the electrolytic solution contains ethylene sulfite, vinylene carbonate, $LiPF_6$, and a light metal salt shown in Chemical formula 1, wherein in the electrolytic solution, the ethylene sulfite content is in the range from 0.1 wt % to 3 wt %, the vinylene carbonate content is in the range from 0.1 wt % to 5 wt %, the $LiPF_6$ content is in the range from 10 wt % to 18 wt %, and the content of the light metal salt shown in Chemical formula 1 is in the range from 0.025 wt % to 1 wt %.

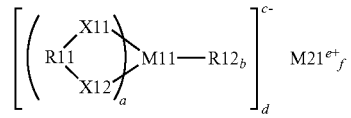

Chemical formula 1

In the formula, R11 represents a —C(=O)—R21-C(=O)- group (R21 represents an alkylene group, an alkylene halide group, an arylene group, or an arylene halide group), or a —C(=O)—C(=O)-group. R12 represents a halogen group, an alkyl group, an alkyl halide group, an aryl group, or an aryl halide group. X11 and X12 represent oxygen (O) or sulfur (S), respectively. M11 represents a transition metal element, or a 3B Group element, a 4B Group element, or a 5B Group element in the short period periodic table. M21 represents an 1A Group element or a 2A Group element in the short period periodic table or aluminum (Al). a represents an integer number from 1 to 4. b represents an integer number from 0 to 8. c, d, e, and f represent an integer number from 1 to 3, respectively.

According to the electrolytic solution of the embodiment of the present invention, since the electrolytic solution contains ethylene sulfite, vinylene carbonate, $LiPF_6$, and a light metal salt shown in Chemical formula 1 at a given content, the stability can be improved. Therefore, according to the battery of the embodiment of the present invention using this electrolytic solution, the self-discharge can be inhibited even under the high temperatures. Further, since ethylene sulfite is contained in the electrolytic solution, the low temperature characteristics can be improved. Further, vinylene carbonate is contained in the electrolytic solution, the charge and discharge efficiency can be improved.

Other and further objects, features and advantages of the invention will appear more fully from the following description.

DETAILED DESCRIPTION OF THE PREFERRED EMBODIMENT

Figure 1:
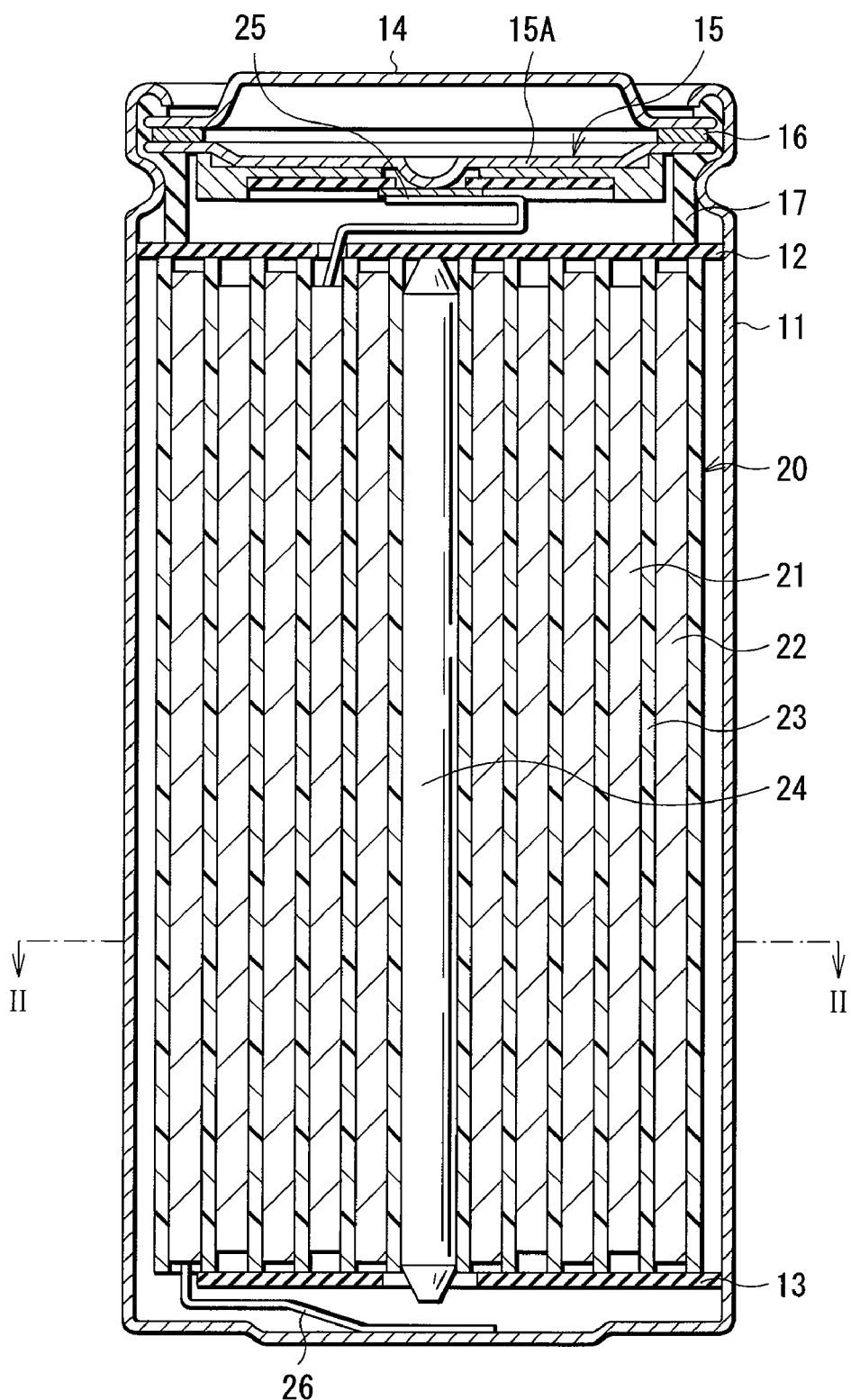
FIG. 1 is a cross section showing a structure of a secondary battery according to an embodiment of the present invention.

An embodiment of the present invention will be hereinafter described in detail with reference to the drawings.

An electrolytic solution according to an embodiment of the present invention contains, for example, a solvent and an electrolyte salt dissolved in the solvent. As a solvent, for example, a nonaqueous solvent such as ethylene carbonate, propylene carbonate, dimethyl carbonate, diethyl carbonate, ethyl methyl carbonate, 1,2-dimethoxyethane, 1,2-diethoxyethane, γ-butyrolactone, tetrahydrofuran, 2-methyl tetrahydrofuran, 1,3-dioxolan, 4-methyl-1,3-dioxolan, diethyl ether, sulfolane, methylsulfolane, acetonitrile, propionitrile, anisole, ester acetate, ester butyrate, and ester propionate can be cited. For the solvent, one thereof may be used singly, or two or more thereof may be used by mixing.

The solvent contains ethylene sulfite shown in Chemical formula 2. Thereby, the stability of the electrolytic solution is improved, and the low temperature characteristics are improved. The ethylene sulfite content in the electrolytic solution is in the range from 0.1 wt % to 3 wt %. When the content is small, effect to improve the low temperature characteristics is not sufficient. Meanwhile, when the content is large, the self-discharge ratio is increased.

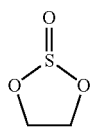

Chemical formula 2

The solvent further contains vinylene carbonate. Thereby, the stability of the electrolytic solution is improved, and the charge and discharge efficiency is improved. The vinylene carbonate content in the electrolytic solution is in the range from 0.1 wt % to 5 wt %. When the content is small, effect to improve the charge and discharge efficiency is not sufficient. Meanwhile, when the content is large, the self-discharge ratio is increased.

The electrolyte salt contains $LiPF_6$. Thereby, a higher electric conductivity can be obtained. The $LiPF_6$ content in the electrolytic solution is in the range from 10 wt % to 18 wt %. When the content is small, sufficient effect is not able to be obtained. Meanwhile, when the content is large, the viscosity of the electrolytic solution is increased.

The electrolyte salt further contains a light metal salt shown in Chemical formula 1. Thereby, the stability of the electrolytic solution is improved, and the self-discharge is inhibited even under the high temperatures. In particular, when the electrolytic solution contains the foregoing ethylene sulfite, vinylene carbonate, and $LiPF_6$, high effect can be obtained. The content of the light metal salt shown in Chemical formula 1 in the electrolytic solution is from 0.025 wt % to 1 wt %. When the content is small, effect to inhibit the self-discharge is not sufficient. Meanwhile, when the content is large, the charge and discharge efficiency is lowered.

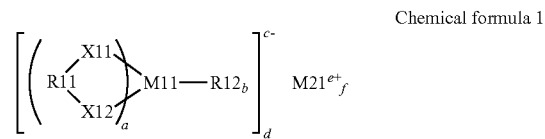

Chemical formula 1

In the formula, R11 represents a group shown in Chemical formula 3 or Chemical formula 4. R12 represents a halogen group, an alkyl group, an alkyl halide group, an aryl group, or an aryl halide group. X11 and X12 represent oxygen (O) or sulfur (S), respectively. M11 represents a transition metal element, or a 3B Group element, a 4B Group element, or a 5B Group element in the short period periodic table. M21 represents an 1A Group element or a 2A Group element in the short period periodic table or aluminum (Al). a represents an integer number from 1 to 4. b represents an integer number from 0 to 8. c, d, e, and f represent an integer number from 1 to 3, respectively.

Chemical formula 3

R21 represents an alkylene group, an alkylene halide group, an arylene group, or an arylene halide group.

Chemical formula 4

As a light metal salt shown in Chemical formula 1, a compound shown in Chemical formula 5 is preferably cited.

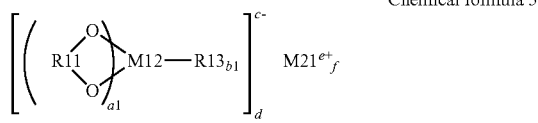

Chemical formula 5

In the formula, R11 represents a group shown in Chemical formula 3 or Chemical formula 4. R13 represents a halogen group. M12 represents phosphorus (P) or boron (B). M21 represents an 1A Group element or a 2A Group element in the short period periodic table or aluminum (Al). a1 represents an integer number from 1 to 3. b1 represents 0, 2, or 4. c, d, e, and f represent an integer number from 1 to 3.

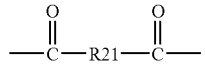

Chemical formula 3

R21 represents an alkylene group, an alkylene halide group, an arylene group, or an arylene halide group.

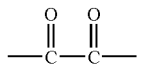

Chemical formula 4

Specifically, lithium difluoro[oxalato-O,O']borate shown in Chemical formula 6, lithium tetrafluoro[oxalato-O,O'] phosphate shown in Chemical formula 7, or lithium difluoro bis[oxalato-O,O']phosphate shown in Chemical formula 8 can be more preferably cited. When B—O bond or P—O bond is included, higher effect can be obtained. In particular, when O—B—O bond or O—P—O bond is included, still higher effect can be obtained.

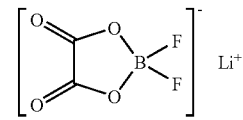

Chemical formula 6

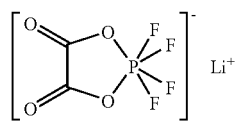

Chemical formula 7

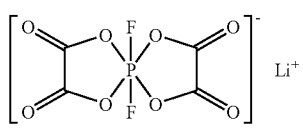

Chemical formula 8

Further, for the electrolyte salt, other electrolyte salt may be mixed with $LiPF_6$ and the light metal salt shown in Chemical formula 1. As other electrolyte salt, for example, a lithium salt such as $LiClO_4$, $LiAsF_6$, $LiBF_4$, $LiB(C_6H_5)_4$, $LiCH_3SO_3$, $LiCF_3SO_3$, LiCl, and LiBr can be cited. As other electrolyte salt, one thereof may be used singly, or two or more thereof may be used by mixing.

The electrolytic solution is used for secondary batteries, for example, as follows.

FIG. 1 shows a cross sectional structure of a secondary battery using this electrolytic solution. The secondary battery is a so-called cylinder-type battery, and has a spirally wound electrode body 20 inside a battery can 11 in the shape of approximately hollow cylinder. The battery can 11 is made of, for example, iron (Fe) plated by nickel (Ni). One end of the battery can 11 is closed, and the other end thereof is opened. Inside the battery can 11, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperature rises, the PTC device 16 limits a current by increasing the resistance value to prevent abnormal heat generation by a large current. The gasket 17 is made of, for example, an insulating material and its surface is coated with asphalt.

Figure 2:
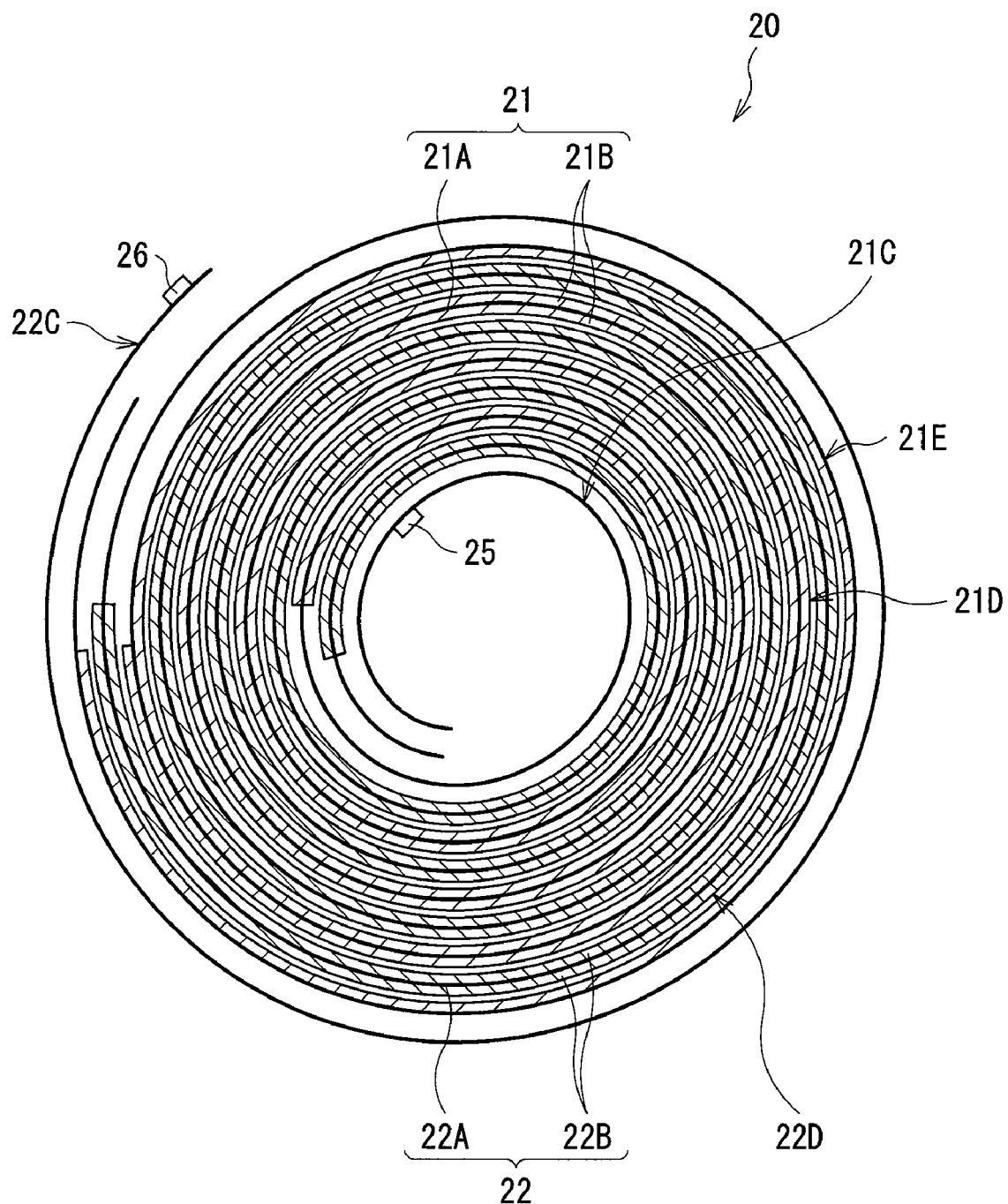
FIG. 2 is a cross section showing a structure taken along line II-II of a spirally wound electrode body shown in FIG. 1.

FIG. 2 shows a cross section taken along line II-II of the spirally wound electrode body 20 shown in FIG. 1. In the spirally wound electrode body 20, a strip-shaped cathode 21 and a strip-shaped anode 22 are layered with a separator 23 in between and spirally wound. A center pin 24 is inserted in the center thereof. In FIG. 2, the separator 23 is omitted. A cathode lead 25 made of aluminum (Al) or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

The cathode 21 has a current collector 21A having a pair of opposed faces and an active material layer 21B provided on the both faces or one face of the current collector 21A. The current collector 21A is made of, for example, aluminum (Al), nickel (Ni), stainless or the like.

The active material layer 21B contains, for example, one or more cathode materials capable of inserting and extracting lithium (Li) as a cathode active material. If necessary, the active material layer 21B may contain an electrical conductor such as a carbon material and a binder such as polyvinylidene fluoride.

As a cathode material capable of inserting and extracting lithium (Li), for example, a lithium-containing compound such as a lithium oxide, a lithium phosphate oxide, a lithium sulfide, and an intercalation compound containing lithium is appropriate. Two or more thereof may be used by mixing. In particular, in order to improve the energy density, a lithium complex oxide or a lithium phosphate oxide expressed by a general formula of $Li_xMIO_2$ or $Li_yMIIPO_4$ is preferable. In the formula, MI and MII represent one or more transition metals, which are preferably, for example, at least one of cobalt (Co), nickel (Ni), manganese (Mn), iron (Fe), aluminum (Al), vanadium (V), titanium (Ti), and zirconium (Zr). Values of x and y vary according to charge and discharge states of the battery, and are generally in the range of $0.05 \leq x \leq 1.10$ and $0.05 \leq y \leq 1.10$. As a specific example of the lithium complex oxide expressed by $Li_xMIO_2$, $LiCoO_2$, $LiNiO_2$, $LiNi_{0.5}Co_{0.5}O_2$, $LiNi_{0.5}Co_{0.2}Mn_{0.3}O_2$, $LiMn_2O_4$ having a spinel crystal structure and the like can be cited. As a specific example of the lithium phosphate compound expressed by $Li_yMIIPO_4$, $LiFePO_4$, $LiFe_{0.5}Mn_{0.5}PO_4$ and the like can be cited.

As the cathode 21, for example, the anode 22 has a current collector 22A having a pair of opposed faces and an active material layer 22B provided on the both faces or one face of the current collector 22A. The current collector 22A is made of, for example, copper (Cu), nickel (Ni), stainless or the like.

The active material layer 22B contains, for example, one or more anode materials capable of inserting and extracting lithium (Li) as an anode active material. If necessary, the active material layer 22B may contain a binder similar to the binder of the cathode 21.

As an anode material capable of inserting and extracting lithium (Li), for example, a carbon material such as graphite, non-graphitizable carbon, and graphitizable carbon can be cited. These carbon materials are preferable, since a change in the crystal structure occurring in charge and discharge is very small, a high charge and discharge capacity can be thereby obtained, and favorable charge and discharge cycle characteristics can be obtained. In particular, graphite is preferable, since graphite has a high capacity and provides a high energy density.

As an anode material capable of inserting and extracting lithium (Li), a material which is capable of inserting and extracting lithium (Li) and contains at least one of metal elements and metalloid elements as an element can be also cited. When such a material is used, a high energy density can be obtained. Such an anode material may be a simple substance, an alloy, or a compound of a metal element or a metalloid element, or may have one or more phases thereof at least in part. In the present invention, alloys include an alloy containing one or more metal elements and one or more metalloid elements, in addition to an alloy including two or more metal elements. Further, an alloy may contain nonmetallic elements. The texture thereof includes a solid solution, a eutectic crystal (eutectic mixture), an intermetallic compound, and a texture in which two or more thereof coexist.

As a metal element or a metalloid element composing the anode material, for example, magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), or platinum (Pt), which is capable of being alloyed with lithium (Li), can be cited. They may be crystalline or amorphous.

Specially, as the anode material, a material containing a metal element or a metalloid element of Group 4B in the short period periodic table as an element is preferable. A material containing at least one of silicon (Si) and tin (Sn) as an element is particularly preferable. Silicon (Si) and tin (Sn) have a high ability to insert and extract lithium (Li), and can provide a high energy density.

As an alloy of tin (Sn), for example, an alloy containing at least one from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second element other than tin (Sn) can be cited. As an alloy of silicon (Si), for example, an alloy containing at least one from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second element other than silicon (Si) can be cited.

As a compound of tin (Sn) or a compound of silicon (Si), for example, a compound containing oxygen (O) or carbon (C) can be cited. In addition to tin (Sn) or silicon (Si), the compound may contain the foregoing second element.

As an anode material capable of inserting and extracting lithium (Li), other metal compound or a high molecular weight material can be further cited. As other metal compound, an oxide such as iron oxide, ruthenium oxide, and molybdenum oxide; $LiN_3$ or the like can be cited. As a high molecular weight material, polyacetylene or the like can be cited.

In the secondary battery, the cathode 21 has an exposed region 21C not provided with the active material layer 21B, a double-faced active material region 21D in which the active material layer 21B is provided on the both faces of the current collector 21A, and an inner-face active material region 21E in which the active material layer 21B is provided only on the inner-face side of the current collector 21A. The anode 22 has an exposed region 22C not provided with the active material layer 22B and a double-faced active material region 22D in which the active material layer 22B is provided on the both faces of the current collector 22A. The active material layer 21B of the cathode 21 is provided so that the active material layer 21B is opposed to the active material layer 22B of the anode 22. One or more circuits of the exposed region 21C are provided on the central side of the spirally wound electrode body. Approximate one circuit of the inner-face active material region 21E is provided on the peripheral side of the spirally wound electrode body. One or more circuits of the exposed region 22C of the anode 22 are provided on the peripheral side of the spirally wound electrode body so that the exposed region 22C is opposed to the current collector 21A of the cathode 21. Thereby, the heat release characteristics are improved. In addition, when a pressure is applied from outside the battery, short circuit is selectively generated on the peripheral side of the spirally wound electrode body to accelerate the thermal diffusion and to improve the safety.

Figure 3:
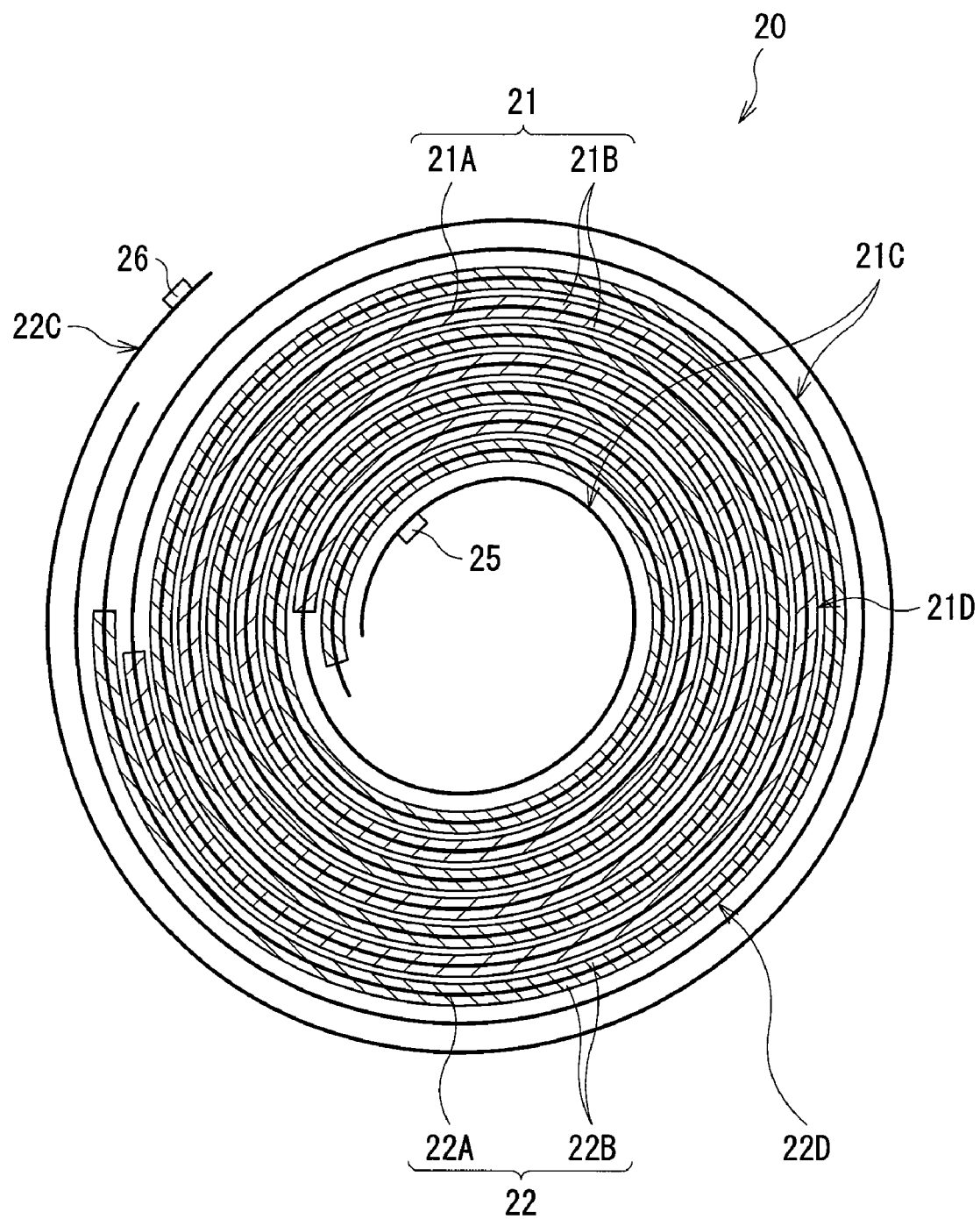
FIG. 3 is a cross section showing another structure taken along line II-II of the spirally wound electrode body shown in FIG. 1.
Figure 4:
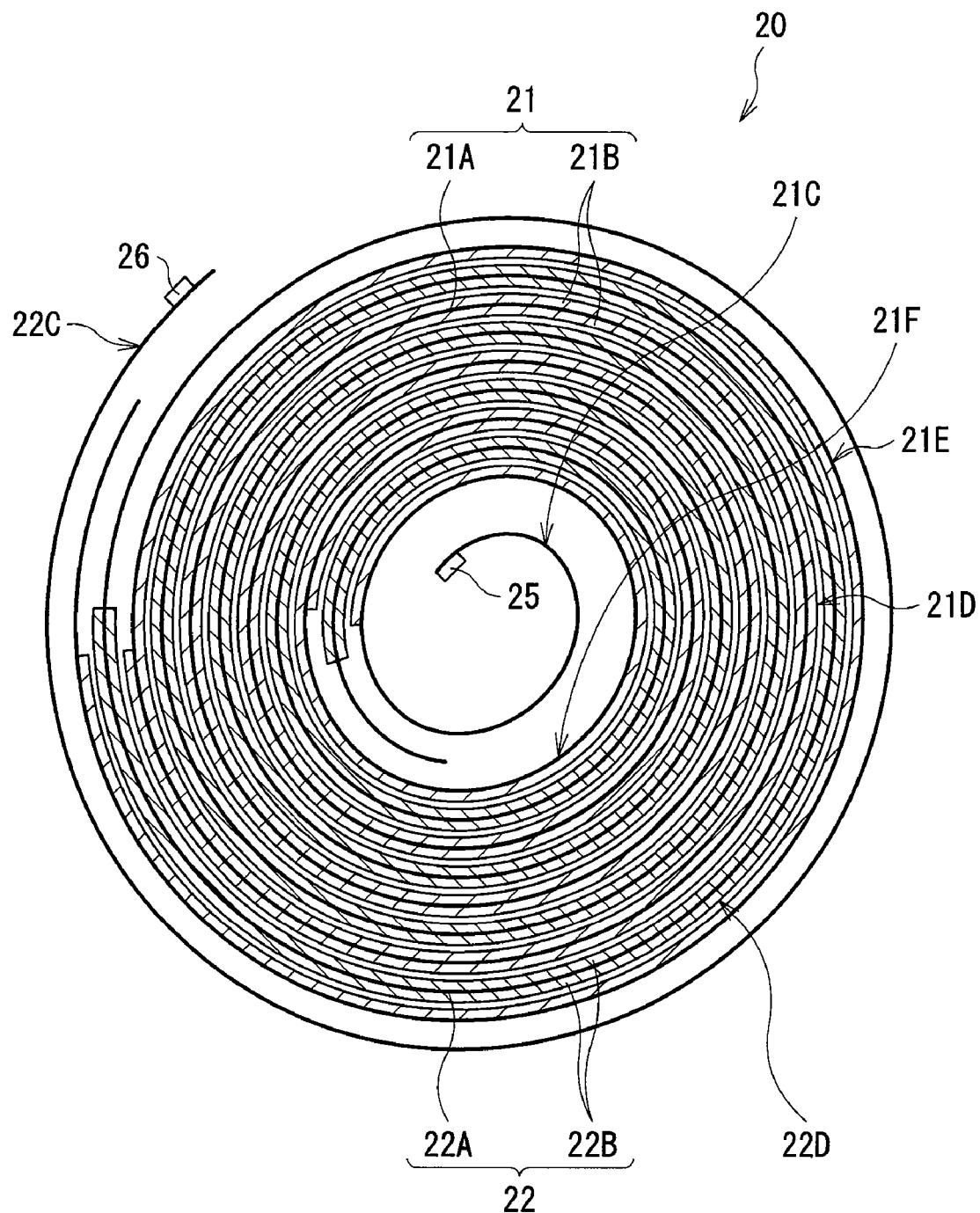
FIG. 4 is a cross section showing still another structure taken along line II-II of the spirally wound electrode body shown in FIG. 1.
Figure 5:
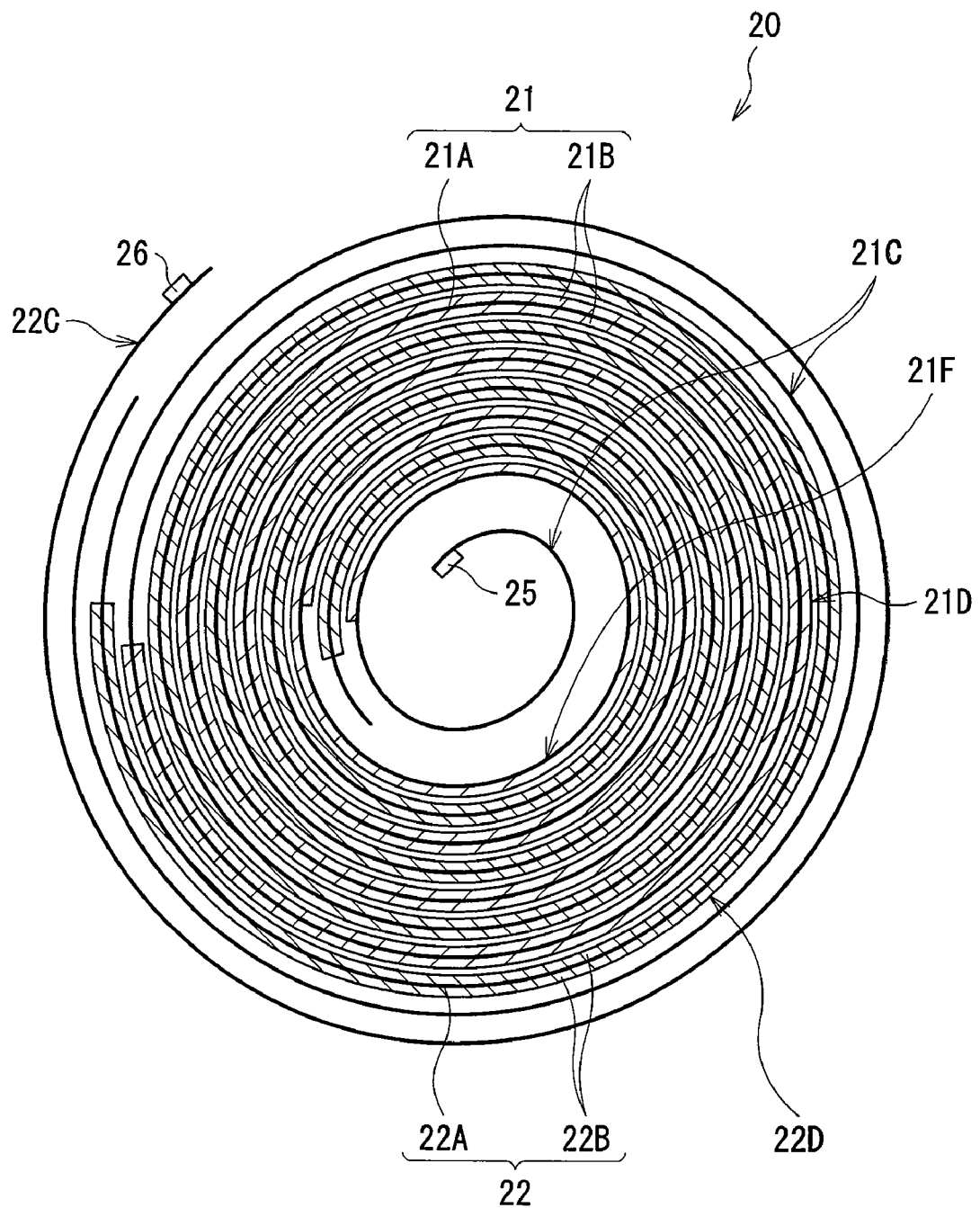
FIG. 5 is a cross section showing still another structure taken along line II-II of the spirally wound electrode body shown in FIG. 1.

As shown in FIG. 3, the cathode 21 may have one or more circuits of the exposed region 21C instead of the inner-face active material region 21E on the peripheral side of the spirally wound electrode body. Further, as shown in FIG. 4, the cathode 21 may have approximate one circuit of an outer-face active material region 21F in which the active material layer 21B is provided only on the outer face side of the current collector 21A instead of the exposed region 21C on the central side of the spirally wound electrode body. Further, as shown in FIG. 5, the cathode 21 may have approximate one circuit of the outer-face active material region 21F instead of the exposed region 21C on the central side of the spirally wound electrode body, and one or more circuits of the exposed region 21C instead of the inner-face active material region 21E on the peripheral side of the spirally wound electrode body. In these cases, the heat release characteristics are improved, and when a pressure is applied from outside the battery, short circuit is selectively generated on the peripheral side of the spirally wound electrode body to accelerate the thermal diffusion and to improve the safety as well. In particular, it is preferable that the exposed region 21C is provided on the central side of the spirally wound electrode body, and the cathode lead 25 is attached to the position not opposed to the anode 22 as shown in FIGS. 4 and 5. Otherwise, there is a possibility that the welding trace of the cathode lead 25 breaks through the separator 23, leading to short circuit. In FIGS. 3 to 5, the separator 23 is omitted as well.

The separator 23 is made of, for example, a porous film made of a polyolefin material such as polypropylene and polyethylene, or a porous film made of an inorganic material such as a ceramics nonwoven. The separator 23 may have a structure in which two or more of the porous films such as the foregoing porous films are layered.

The electrolytic solution according to this embodiment is impregnated in the separator 23. Thereby, a favorable coat is formed on the surface of the anode 22, and decomposition reaction of the electrolytic solution is inhibited. Thereby, the self-discharge is inhibited even under the high temperatures. Further, the low temperature characteristics and the charge and discharge efficiency are improved.

The secondary battery can be manufactured, for example, as follows.

First, for example, a cathode material, an electrical conductor, and a binder are mixed to prepare a cathode mixture, which is dispersed in a solvent such as N-methyl-2-pyrrolidone to obtain cathode mixture slurry. Next, the current collector 21A is coated with the cathode mixture slurry, and the solvent is dried. After that, the resultant is compression-molded to form the cathode active material layer 21B and thereby forming the cathode 21.

Further, for example, an anode material and a binder are mixed to prepare an anode mixture, which is dispersed in a solvent such as N-methyl-2-pyrrolidone to obtain anode mixture slurry. Next, the current collector 22A is coated with the anode mixture slurry, and the solvent is dried. After that, the resultant is compression-molded to form the anode active material layer 22B and thereby forming the anode 22.

Subsequently, the cathode lead 25 is attached to the current collector 21A by welding or the like, and the anode lead 26 is attached to the current collector 22A by welding or the like. After that, the cathode 21 and the anode 22 are layered with the separator 23 in between and spirally wound. The end of the cathode lead 25 is welded to the safety valve mechanism 15, and the end of the anode lead 26 is welded to the battery can 11. The spirally wound cathode 21 and the spirally wound anode 22 are sandwiched between the pair of insulating plates 12 and 13, and contained inside the battery can 11. After the cathode 21 and the anode 22 are contained inside the battery can 11, the electrolytic solution is injected into the battery can 11 and impregnated in the separator 23. After that, at the open end of the battery can 11, the battery cover 14, the safety valve mechanism 15, and the PTC device 16 are fixed by being caulked with the gasket 17. The secondary battery shown in FIG. 1 is thereby completed.

In the secondary battery, when charged, for example, lithium ions are extracted from the cathode 21 and inserted in the anode 22 through the electrolytic solution. Meanwhile, when discharged, for example, lithium ions are extracted from the anode 22 and inserted in the cathode 21 through the electrolytic solution. Here, the electrolytic solution contains ethylene sulfite, vinylene carbonate, $LiPF_6$, and the light metal salt shown in Chemical formula 1 at the foregoing content. Therefore, a favorable coat is formed on the anode 22 in the initial charge. Thereby, the decomposition reaction of the electrolytic solution is inhibited and the self-discharge is inhibited even under the high temperatures.

As above, according to the electrolytic solution of this embodiment, since the electrolytic solution contains ethylene sulfite, vinylene carbonate, $LiPF_6$, and the light metal salt shown in Chemical formula 1 at a given content, stability can be improved. Therefore, according to the secondary battery of this embodiment using the electrolytic solution, the self-discharge can be inhibited even under the high temperatures. Further, since the electrolytic solution contains ethylene sulfite, the low temperature characteristics can be improved. Further, since the electrolytic solution contains vinylene carbonate, the charge and discharge efficiency can be improved.

Further, specific examples of the present invention will be described in detail.

Example 1-1

The secondary battery shown in FIG. 1 was fabricated. First, 93 parts by weight of lithium cobalt complex oxide ($LiCoO_2$) as a cathode material, 3 parts by weight of Ketjen black as an electrical conductor, and 4 parts by weight of polyvinylidene fluoride as a binder were mixed to prepare a cathode mixture. Subsequently, the cathode mixture was dispersed in N-methyl-2-pyrrolidone as a solvent to obtain cathode mixture slurry. Both faces of the current collector 21A made of a strip-shaped aluminum foil were uniformly coated with the cathode mixture slurry, which was dried and compression-molded by a rolling press machine to form the active material layer 21B and thereby forming the cathode 21. After that, the cathode lead 25 made of aluminum was attached to one end of the current collector 21A.

Further, 94 parts by weight of graphite as an anode material and 6 parts by weight of polyvinylidene fluoride as a binder were dispersed in N-methyl-2-pyrrolidone as a solvent. After that, the current collector 22A made of a strip-shaped copper foil was uniformly coated with the resultant, which was dried to form the active material layer 22B and thereby forming the anode 22. After that, the anode lead 26 made of nickel was attached to one end of the current collector 22A.

After the cathode 21 and the anode 22 were respectively formed, the separator 23 made of polyethylene was prepared. Then, the anode 22, the separator 23, the cathode 21, and the separator 23 were layered in this order, and the resultant lamination was spirally wound many times. The end portion thereof was fixed by an adhesive tape to form the spirally wound electrode body 20. The structure of the spirally wound electrode body 20 was as shown in FIG. 4.

After the spirally wound electrode body 20 was formed, the spirally wound electrode body 20 was sandwiched between the pair of insulating plates 12 and 13. The anode lead 26 was welded to the battery can 11, the cathode lead 25 was welded to the safety valve mechanism 15, and the spirally wound electrode body 20 was contained inside the battery can 11 made of nickel-plated iron. Next, an electrolytic solution was injected into the battery can 11 by depressurization method. After that, the battery cover 14 and the battery can 11 were caulked with the gasket 17 with the surface coated with asphalt. Thereby, the cylinder-type secondary battery shown in FIG. 1 was fabricated.

For the electrolytic solution, an electrolytic solution obtained by dissolving $LiPF_6$ and lithium difluoro[oxalato-O,O']borate shown in Chemical formula 6 as an electrolyte salt in a mixed solvent of ethylene carbonate, dimethyl carbonate, ethylene sulfite shown in Chemical formula 2, and vinylene carbonate was used. The volume ratio of ethylene carbonate and dimethyl carbonate was ethylene carbonate: dimethyl carbonate=8:2. Further, in the electrolytic solution, the ethylene sulfite content was 1 wt %, the vinylene carbonate content was 1 wt %, $LiPF_6$ content was 16 wt %, and lithium difluoro[oxalato-O,O']borate content was 0.1 wt %.

As Comparative examples 1-1 to 1-3 relative to Example 1-1, secondary batteries were fabricated in the same manner as in Example 1-1, except that lithium difluoro[oxalato-O,O'] borate, ethylene sulfite, or vinylene carbonate was not used. Further, as Comparative example 1-4, a secondary battery was fabricated in the same manner as in Example 1-1, except that ethylene sulfite and vinylene carbonate were not used.

For the fabricated secondary batteries of Example 1-1 and Comparative examples 1-1 to 1-4, the self-discharge ratio, the low temperature characteristics, and the cycle characteristics under the high temperatures were examined.

The self-discharge ratio was obtained as follows. First, after charge was performed at 23 deg C. at a constant current of 1 C for 3 hours at the battery voltage of 4.2 V, discharge was performed at a constant current of 1 C until the battery voltage reached 2.5 V. Then, the discharge capacity before storage was obtained. Next, after charge was performed at 23 deg C. under similar conditions, the batteries were left at 60 deg C. for 30 days. Subsequently, the temperature was changed to 23 deg C. again, and discharge was performed at a constant current of 1 C until the battery voltage reached 2.5 V. Then, the discharge capacity after storage was obtained. The self-discharge ratio was obtained by multiplying the result obtained by subtracting the discharge capacity ratio after storage to the discharge capacity before storage from 1 by 100, that is, obtained from [1-(discharge capacity after storage/discharge capacity before storage)]×100(%). The results are shown in Table 1. 1 C means a current value at which the battery capacity can be discharged in 1 hour.

The low temperature characteristics were obtained as follows. First, after charge was performed at 23 deg C. at a constant current of 1 C for 3 hours at the battery voltage of 4.2 V, discharge was performed at a constant current of 1 C until the battery voltage reached 2.5 V. Then, the discharge capacity at 23 deg C. was obtained. Subsequently, after charge was performed at 0 deg C. at a constant current of 1 C for 3 hours at the battery voltage of 4.2 V, discharge was performed at a constant current of 1 C until the battery voltage reached 2.5 V. Then, the discharge capacity at 0 deg C. was obtained. The low temperature characteristics were obtained from the discharge capacity ratio at 0 deg C. to the discharge capacity at 23 deg C., that is, (discharge capacity at 0 deg C./discharge capacity at 23 deg C.)×100(%). The results are shown in Table 1.

Further, the cycle characteristics were obtained as follows. 300 cycles of charge and discharge in which after charge was performed at 23 deg C. at a constant current of 1 C for 3 hours at the battery voltage of 4.2 V, discharge was performed at a constant current of 1 C until the battery voltage reached 2.5 V were performed. Then, the cycle characteristics were obtained by the discharge capacity ratio at the 300th cycle to the discharge capacity at the first cycle, that is, (discharge capacity at the 300th cycle/discharge capacity at the first cycle)×100(%). The results are shown in Table 1.

alato-O,O']borate for the electrolytic solution, the self-discharge ratio was lower than in Comparative example 1-1 not using lithium difluoro[oxalato-O,O']borate. Further, according to Example 1-1, the low temperature characteristics were improved more than in Comparative examples 1-2 and 1-4 not using ethylene sulfite. Further, according to Example 1-1, the cycle characteristics were improved more than in Comparative examples 1-3 and 1-4 not using vinylene carbonate.

In addition, in Example 1-1 using ethylene sulfite and vinylene carbonate, the self-discharge inhibition effect was significantly improved due to addition of lithium difluoro [oxalato-O,O']borate, compared to in Comparative examples 1-2 to 1-4 not using one thereof or the both thereof.

That is, it was found that when ethylene sulfite, vinylene carbonate, $LiPF_6$, and the light metal shown in Chemical formula 1 were used, the self-discharge inhibition effect could be significantly improved.

Examples 2-1 and 2-2

Secondary batteries were fabricated in the same manner as in Example 1-1, except that the lithium difluoro[oxalato-O, O']borate content in the electrolytic solution was 0.025 wt % or 1 wt %.

As Comparative examples 2-1 and 2-2 relative to Examples 2-1 and 2-2, secondary batteries were fabricated in the same manner as in Examples 2-1 and 2-2, except that the lithium difluoro[oxalato-O,O']borate content in the electrolytic solution was 3 wt % or 6 wt %.

For the fabricated secondary batteries of Examples 2-1, 2-2 and Comparative examples 2-1, 2-2, the self-discharge ratio, the low temperature characteristics, and the cycle characteristics under the high temperatures were examined in the same manner as in Example 1-1. The results are shown in Table 2

TABLE 1

| | Electrolyte salt (wt %) | | ethylene sulfite (wt %) | Vinylene carbonate (wt %) | Self-discharge ratio (%) | Low temperature characteristics (%) | Cycle characteristics (%) |
|---|---|---|---|---|---|---|---|
| | $LiPF_6$ | Chemical formula 6 | | | | | |
| Example 1-1 | 16 | 0.1 | 1 | 1 | 4.5 | 88 | 79 |
| Comparative example 1-1 | 16 | 0 | 1 | 1 | 10.0 | 88 | 79 |
| Comparative example 1-2 | 16 | 0.1 | 0 | 1 | 6.5 | 70 | 79 |
| Comparative example 1-3 | 16 | 0.1 | 1 | 0 | 6.4 | 89 | 70 |
| Comparative example 1-4 | 16 | 0.1 | 0 | 0 | 6.6 | 68 | 69 |

Chemical formula 6: lithium difluoro[oxalato-O,O'] borate

As evidenced by Table 1, according to Example 1-1 using ethylene sulfite carbonate, $LiPF_6$, and lithium difluoro[oxtogether with the results of Example 1-1 and Comparative example 1-1.

TABLE 2

| | Electrolyte salt (wt %) | | Ethylene sulfite (wt %) | Vinylene carbonate (wt %) | Self-discharge ratio (%) | Low temperature characteristics (%) | Cycle characteristics (%) |
|---|---|---|---|---|---|---|---|
| | $LiPF_6$ | Chemical formula 6 | | | | | |
| Example 2-1 | 16 | 0.025 | 1 | 1 | 4.4 | 87 | 80 |
| Example 1-1 | 16 | 0.1 | 1 | 1 | 4.5 | 88 | 79 |
| Example 2-2 | 16 | 1 | 1 | 1 | 4.5 | 87 | 78 |

TABLE 2-continued

|  | Electrolyte salt (wt %) | | Ethylene sulfite (wt %) | Vinylene carbonate (wt %) | Self-discharge ratio (%) | Low temperature characteristics (%) | Cycle characteristics (%) |
|---|---|---|---|---|---|---|---|
|  | LiPF$_6$ | Chemical formula 6 |  |  |  |  |  |
| Comparative example 1-1 | 16 | 0 | 1 | 1 | 10.0 | 88 | 79 |
| Comparative example 2-1 | 16 | 3 | 1 | 1 | 4.4 | 88 | 60 |
| Comparative example 2-2 | 16 | 6 | 1 | 1 | 4.3 | 87 | 40 |

Chemical formula 6: lithium difluoro[oxalato-O,O'] borate

As evidenced by Table 2, when the lithium difluoro[oxalato-O,O']borate content in the electrolytic solution was 0.025 wt % or more, the self-discharge ratio was significantly lowered. Meanwhile, when the lithium difluoro[oxalato-O,O']borate content in the electrolytic solution exceeded 1 wt %, the cycle characteristics were significantly lowered.

That is, it was found that the lithium difluoro[oxalato-O,O']borate content in the electrolytic solution was preferably from 0.025 wt % to 1 wt %.

EXAMPLES 3-1 AND 3-2

Secondary batteries were fabricated in the same manner as in Example 1-1, except that the ethylene sulfite content in the electrolytic solution was 0.1 wt % or 3 wt %.

As Comparative example 3-1 relative to Examples 3-1 and 3-2, a secondary battery was fabricated in the same manner as in Examples 3-1 and 3-2, except that the ethylene sulfite content in the electrolytic solution was 5 wt %.

For the fabricated secondary batteries of Examples 3-1, 3-2 and Comparative example 3-1, the self-discharge ratio, the low temperature characteristics, and the cycle characteristics under the high temperatures were examined in the same manner as in Example 1-1. The results are shown in Table 3 together with the results of Example 1-1 and Comparative example 1-2.

acteristics were improved. However, when the ethylene sulfite content in the electrolytic solution exceeded 3 wt %, the self-discharge ratio was lowered.

That is, it was found that the ethylene sulfite content in the electrolytic solution was preferably from 0.1 wt % to 3 wt %.

Examples 4-1 and 4-2

Secondary batteries were fabricated in the same manner as in Example 1-1, except that the vinylene carbonate content in the electrolytic solution was 0.1 wt % or 5 wt %.

As Comparative example 4-1 relative to Examples 4-1 and 4-2, a secondary battery was fabricated in the same manner as in Examples 4-1 and 4-2, except that the vinylene carbonate content in the electrolytic solution was 7 wt %.

For the fabricated secondary batteries of Examples 4-1, 4-2 and Comparative example 4-1, the self-discharge ratio, the low temperature characteristics, and the cycle characteristics under the high temperatures were examined in the same man-

TABLE 3

|  | Electrolyte salt (wt %) | | Ethylene sulfite (wt %) | Vinylene carbonate (wt %) | Self-discharge ratio (%) | Low temperature characteristics (%) | Cycle characteristics (%) |
|---|---|---|---|---|---|---|---|
|  | LiPF$_6$ | Chemical formula 6 |  |  |  |  |  |
| Example 3-1 | 16 | 0.1 | 0.1 | 1 | 4.4 | 85 | 79 |
| Example 1-1 | 16 | 0.1 | 1 | 1 | 4.5 | 88 | 79 |
| Example 3-2 | 16 | 0.1 | 3 | 1 | 4.7 | 87 | 79 |
| Comparative example 1-2 | 16 | 0.1 | 0 | 1 | 6.5 | 70 | 79 |
| Comparative example 3-1 | 16 | 0.1 | 5 | 1 | 7.0 | 87 | 79 |

Chemical formula 6: lithium difluoro[oxalato-O,O'] borate

As evidenced by Table 3, when the ethylene sulfite content in the electrolytic solution was 0.1 wt % or more, the self-discharge ratio was lowered, and the low temperature charner as in Example 1-1. The results are shown in Table 4 together with the results of Example 1-1 and Comparative example 1-3.

TABLE 4

| | Electrolyte salt (wt %) | | Ethylene sulfite (wt %) | Vinylene carbonate (wt %) | Self-discharge ratio (%) | Low temperature characteristics (%) | Cycle characteristics (%) |
|---|---|---|---|---|---|---|---|
| | $LiPF_6$ | Chemical formula 6 | | | | | |
| Example 4-1 | 16 | 0.1 | 1 | 0.1 | 4.5 | 85 | 77 |
| Example 1-1 | 16 | 0.1 | 1 | 1 | 4.5 | 88 | 79 |
| Example 4-2 | 16 | 0.1 | 1 | 5 | 4.4 | 83 | 80 |
| Comparative example 1-3 | 16 | 0.1 | 1 | 0 | 6.4 | 89 | 70 |
| Comparative example 4-1 | 16 | 0.1 | 1 | 7 | 6.9 | 70 | 79 |

Chemical formula 6: lithium difluoro[oxalato-O,O'] borate

As evidenced by Table 4, when the vinylene carbonate content in the electrolytic solution was 0.1 wt % or more, the self-discharge ratio was lowered, and the cycle characteristics were improved. Meanwhile, when the vinylene carbonate content in the electrolytic solution exceeded 5 wt %, the self-discharge ratio was lowered.

That is, it was found that the vinylene carbonate content in the electrolytic solution was preferably from 0.1 wt % to 5 wt %.

Examples 5-1 and 5-2

Secondary batteries were fabricated in the same manner as in Example 1-1, except that the $LiPF_6$ content in the electrolytic solution was 10 wt % or 18 wt %.

As Comparative example 5-1 relative to Examples 5-1 and 5-2, a secondary battery was fabricated in the same manner as in Examples 5-1 and 5-2, except that $LiBF_4$ was used instead of $LiPF_6$. Further, as Comparative examples 5-2 and 5-3, secondary batteries were fabricated in the same manner as in Examples 5-1 and 5-2, except that the $LiPF_6$ content in the electrolytic solution was 8 wt % or 20 wt %.

For the fabricated secondary batteries of Examples 5-1, 5-2 and Comparative examples 5-1 to 5-3, the self-discharge ratio, the low temperature characteristics, and the cycle characteristics under the high temperatures were examined in the same manner as in Example 1-1. The results are shown in Table 5 together with the results of Example 1-1.

As evidenced by Table 5, according to Examples 1-1, 5-1, and 5-2, in which the $LiPF_6$ content in the electrolytic solution was in the range from 10 wt % to 18 wt %, the cycle characteristics were improved more than in Comparative examples 5-2 and 5-3, in which the $LiPF_6$ content in the electrolytic solution was out of the range, or Comparative example 5-1 using $LiBF_4$.

That is, it was found that $LiPF_6$ content in the electrolytic solution was preferably in the range from 10 wt % to 18 wt %.

Examples 6-1 and 6-2

Secondary batteries were fabricated in the same manner as in Example 1-1, except that lithium nickel complex oxide ($LiNiO_2$) or lithium manganese complex oxide ($LiMn_2O_4$) was used instead of $LiCoO_2$ as a cathode material.

For the fabricated secondary batteries of Examples 6-1 and 6-2, the self-discharge ratio, the low temperature characteristics, and the cycle characteristics under the high temperatures were examined in the same manner as in Example 1-1. The results are shown in Table 6 together with the results of Example 1-1.

TABLE 5

| | Electrolyte salt (wt %) | | Chemical formula 6 (wt %) | Ethylene sulfite (wt %) | Vinylene carbonate (wt %) | Self-discharge ratio (%) | Low temperature characteristics (%) | Cycle characteristics (%) |
|---|---|---|---|---|---|---|---|---|
| | Kind | wt % | | | | | | |
| Example 5-1 | $LiPF_6$ | 10 | 0.1 | 1 | 1 | 4.5 | 87 | 76 |
| Example 1-1 | | 16 | 0.1 | 1 | 1 | 4.5 | 88 | 79 |
| Example 5-2 | | 18 | 0.1 | 1 | 1 | 4.6 | 87 | 79 |
| Comparative example 5-1 | $LiBF_4$ | 16 | 0.1 | 1 | 1 | 4.5 | 87 | 70 |
| Comparative example 5-2 | $LiPF_6$ | 8 | 0.1 | 1 | 1 | 4.3 | 87 | 70 |
| Comparative example 5-3 | | 20 | 0.1 | 1 | 1 | 4.7 | 87 | 71 |

Chemical formula 6: lithium difluoro[oxalato-O,O'] borate

TABLE 6

| | Cathode active material | Electrolyte salt (wt %) | | Ethylene sulfite (wt %) | Vinylene carbonate (wt %) | Self-discharge ratio (%) | Low temperature characteristics (%) | Cycle characteristics (%) |
|---|---|---|---|---|---|---|---|---|
| | | $LiPF_6$ | Chemical formula 6 | | | | | |
| Example 1-1 | $LiCoO_2$ | 16 | 0.1 | 1 | 1 | 4.5 | 88 | 79 |
| Example 6-1 | $LiNiO_2$ | 16 | 0.1 | 1 | 1 | 4.5 | 87 | 78 |
| Example 6-2 | $LiMn_2O_4$ | 16 | 0.1 | 1 | 1 | 4.5 | 87 | 78 |

Chemical formula 6: lithium difluoro[oxalato-O,O'] borate

As evidenced by Table 6, in Examples 6-1 and 6-2 using $LiNiO_2$ or $LiMn_2O_4$, high effect could be obtained similarly to in Example 1-1.

That is, it was found that when other cathode material was used, the self-discharge inhibition effect could be significantly improved, as long as ethylene sulfite, vinylene carbonate, $LiPF_6$, and the light metal salt shown in Chemical formula 1 were used and the contents thereof in the electrolytic solution were in a given range.

Example 7-1

A secondary battery was fabricated in the same manner as in Example 1-1, except that copper-tin alloy was used as an anode material. The anode 22 was formed as follows. 80 parts by weight of copper-tin alloy as an anode material, 11 parts by weight of graphite (KS-15 of Lonza) as an anode material and an electrical conductor, 1 part by weight of acetylene black as an electrical conductor, and 8 parts by weight of polyvinylidene fluoride as a binder were dispersed in N-methyl-2-pyrrolidone as a solvent. After that, the current collector 22A made of a strip-shaped copper foil was uniformly coated with the resultant, which was dried to form the active material layer 22B and thereby forming the anode 22. Further, the copper-tin alloy was formed as follows. Tin powder and copper powder were mixed at a weight ratio of tin powder:copper powder=9:1, the mixture was arranged on the quartz boat. After that, the resultant was heated in the argon atmosphere at 1000 deg C. Then, the resultant was cooled down to the room temperatures to obtain the copper-tin alloy.

For the fabricated secondary battery of Example 7-1, the self-discharge ratio, the low temperature characteristics, and the cycle characteristics under the high temperatures were examined in the same manner as in Example 1-1. The results are shown in Table 7 together with the results of Example 1-1.

As evidenced by Table 7, in Example 7-1 using copper-tin alloy as an anode material, high effect could be obtained similarly to in Example 1-1.

That is, it was found that when other anode material was used, the self-discharge inhibition effect could be significantly improved, as long as ethylene sulfite, vinylene carbonate, $LiPF_6$, and the light metal salt shown in Chemical formula 1 were used and the contents thereof in the electrolytic solution were in a given range.

Examples 8-1 to 8-3

Secondary batteries were fabricated in the same manner as in Example 1-1, except that the structure of the spirally wound electrode body 20 was as shown in FIG. 2, 3, or 5.

For the fabricated secondary batteries of Examples 8-1 to 8-3, the self-discharge ratio, the low temperature characteristics, and the cycle characteristics under the high temperatures were examined in the same manner as in Example 1-1. The results are shown in Table 8 together with the results of Example 1-1.

TABLE 7

| | Anode active material | Electrolyte salt (wt %) | | Ethylene sulfite (wt %) | Vinylene carbonate (wt %) | Self-discharge ratio (%) | Low temperature characteristics (%) | Cycle characteristics (%) |
|---|---|---|---|---|---|---|---|---|
| | | $LiPF_6$ | Chemical formula 6 | | | | | |
| Example 1-1 | Graphite | 16 | 0.1 | 1 | 1 | 4.5 | 88 | 79 |
| Example 7-1 | Cu—Sn + graphite | 16 | 0.1 | 1 | 1 | 4.5 | 87 | 79 |

Chemical formula 6: lithium difluoro[oxalato-O,O'] borate

TABLE 8

| | Electrolyte salt (wt %) | | Ethylene sulfite (wt %) | Vinylene carbonate (wt %) | Spirally wound electrode body | Self-discharge ratio (%) | Low temperature characteristics (%) | Cycle characteristics (%) |
| --- | --- | --- | --- | --- | --- | --- | --- | --- |
| | $LiPF_6$ | Chemical formula 6 | | | | | | |
| Example 1-1 | 16 | 0.1 | 1 | 1 | FIG. 4 | 4.5 | 88 | 79 |
| Example 8-1 | 16 | 0.1 | 1 | 1 | FIG. 2 | 4.4 | 87 | 79 |
| Example 8-2 | 16 | 0.1 | 1 | 1 | FIG. 3 | 4.5 | 88 | 80 |
| Example 8-3 | 16 | 0.1 | 1 | 1 | FIG. 5 | 4.4 | 87 | 79 |

Chemical formula 6: lithium difluoro[oxalato-O,O'] borate

As evidenced by Table 8, in Examples 8-1 to 8-3 using the spirally wound electrode body 20 having the structure as shown in FIG. 2, 3, or 5, high effect could be obtained similarly to in Example 1-1.

That is, it was found that when the spirally wound electrode body 20 having other structure was used, the self-discharge inhibition effect could be significantly improved, as long as ethylene sulfite, vinylene carbonate, $LiPF_6$, and the light metal salt shown in Chemical formula 1 were used and the contents thereof in the electrolytic solution were in a given range.

The present invention has been described with reference to the embodiment and the examples. However, the present invention is not limited to the foregoing embodiment and the foregoing examples, and various modifications may be made. For example, in the foregoing embodiment and the foregoing examples, descriptions have been given of the secondary battery having the structure of the spirally wound electrode body 20 with specific examples. However, the present invention can be similarly applied to a secondary battery having other spirally wound structure. Further, the present invention can be similarly applied to an oval or polygon secondary battery having a spirally wound structure, or a secondary battery having a structure in which the cathode and the anode are folded or a structure in which the cathode and the anode are layered.

Further, in the foregoing embodiment and the foregoing examples, descriptions have been given of the case using the liquid electrolytic solution. However, a gelatinous electrolyte obtained by holding an electrolytic solution in a high molecular weight compound may be used. Any high molecular weight compound may be used as long as the high molecular weight compound absorbs and gelates the electrolytic solution. For example, a fluorinated high molecular weight compound such as polyvinylidene fluoride and a copolymer of vinylidene fluoride and hexafluoropropylene; an ether high molecular weight compound such as polyethylene oxide and a cross-linked body containing polyethylene oxide; and polyacrylonitrile can be cited. In particular, in view of redox stability, the fluorinated high molecular weight compound is desirable. Further, a mixture of a liquid electrolytic solution or a gelatinous electrolyte and an ion conductive inorganic compound such as ion conductive ceramics, ion conductive glass, and ionic crystal; or a mixture of a liquid electrolytic solution or a gelatinous electrolyte and other inorganic compound may be used.

Further, in the foregoing embodiment and the foregoing examples, descriptions have been given of the battery using lithium (Li) for electrode reaction. However, the present invention can be applied to the case using other alkali metal such as sodium (Na) and potassium (K); an alkali earth metal such as magnesium (Mg) and calcium (Ca); or other light metal such as aluminum (Al).

In addition, in the foregoing embodiment and the foregoing examples, descriptions have been given of the cylinder-type secondary battery. However, the present invention can be similarly applied to a coin-type secondary battery, a button-type secondary battery, a square-type secondary battery, or a secondary battery having other shape using a package member such as a laminated film. Further, the present invention can be applied to other batteries such as primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

What is claimed is:

1. An electrolytic solution comprising (a) an ethylene sulfide, (b) a vinylene carbonate, (c) a $LiPF_6$, and (d) a compound represented by a Chemical formula 1:

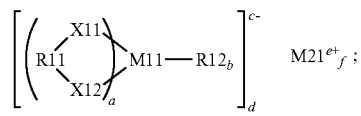

where,

R11 represents a —C(=O)—R21-C(=O)-group;

R21 represents an alkylene group, an alkylene halide group, an arylene group, or an arylene halide group, or a —C(=O)—C(=O)-group;

R12 represents a halogen group, an alkyl group, an alkyl halide group, an aryl group, or an aryl halide group;

each of X11 and X12 represent oxygen (O) or sulfur (S);

M11 represents a transition metal element, a 313 Group element, a 413 Group element, or a 513 Group element in the short period periodic table;

M21 represents an IA Group element or a 2A Group element in the short period periodic table or aluminum (Al);

a represents an integer number from 1 to 4;

b represents an integer number from 0 to 8m; and each of c, d, e and f represent an integer number from 1 to 3, wherein, the ethylene sulfide content is in the range from 0.1 wt % to 3 wt %, the vinylene carbonate content is in the range from 0.1 wt % to 5 wt %, the $LiPF_6$ content is in the range from 10 wt % to 18 wt %, and the content of the light metal salt shown in Chemical formula 1 is in the range from 0.025 wt % to 1 wt %.

2. The electrolytic solution according to claim 1, wherein the light metal salt shown in Chemical formula 1 includes lithium difluoro[oxalato-O,O']borate shown in Chemical formula 2

Chemical formula 2

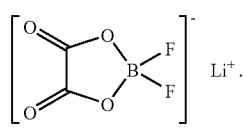

3. A battery comprising:
a cathode;
an anode; and
an electrolytic solution comprising (a) an ethylene sulfide, (b) a vinylene carbonate, (c) a LiPF$_6$, and (d) a compound represented by a Chemical formula 3:

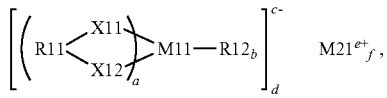

where,
R11 represents a —C,(═O)—R21-C(═O)-group;
R21 represents an alkylene group, an alkylene halide group, an arylene group, or an arylene halide group, or a —C(═O)—C(═O)-group;
R12 represents a halogen group, an alkyl group, an alkyl halide group, an aryl group, or an aryl halide group;
each of X11 and X12 represent oxygen (O) or sulfur (S);
M11 represents a transition metal element, a 3B Group element, a 413 Group element, or a 513 Group element in the short period periodic table;
M21 represents an 1A Group element or a 2A Group element in the short period periodic table or aluminum (Al);
a represents an integer number from 1 to 4;
b represents an integer number from 0 to 8 m:
each of c, d, e and P represent an integer number from 1 to 3, and
wherein,
in the electrolytic solution, the ethylene sulfide content is in the range from 0.1 wt % to 3 wt %,
the vinylene carbonate content is in the range from 0.1 wt % to 5 wt %,
the LiPF$_6$ content is in the range from 10 wt % to 18 wt %, and
the content of the light metal salt shown in Chemical formula 3 is in the range from 0.025 wt % to 1 wt %.

4. The battery according to claim 3, wherein the compound represented by Chemical formula 3 includes lithium difluoro [oxalato-O,O']borate shown in Chemical formula 4

Chemical formula 4

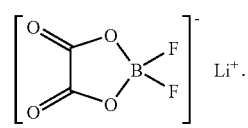

* * * * *